(12) United States Patent
Ge et al.

(10) Patent No.: US 11,516,310 B2
(45) Date of Patent: Nov. 29, 2022

(54) METHOD AND APPARATUS FOR INVOKING APPLICATION PROGRAMMING INTERFACE

(71) Applicant: Huawei Technologies Co., Ltd., Shenzhen (CN)

(72) Inventors: Cuili Ge, Beijing (CN); Yanmei Yang, Beijing (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/374,732

(22) Filed: Jul. 13, 2021

(65) Prior Publication Data

US 2021/0344774 A1 Nov. 4, 2021

Related U.S. Application Data

(63) Continuation of application No. PCT/CN2019/129786, filed on Dec. 30, 2019.

(30) Foreign Application Priority Data

Jan. 14, 2019 (CN) .......................... 201910033239.1

(51) Int. Cl.
*H04L 67/60* (2022.01)
(52) U.S. Cl.
CPC .................................. *H04L 67/60* (2022.05)
(58) Field of Classification Search
CPC ....................................................... H04L 67/60

(Continued)

(56) References Cited

U.S. PATENT DOCUMENTS

2011/0289518 A1 11/2011 Li et al.
2017/0277577 A1* 9/2017 Greenwood ............... G06F 8/38
2019/0149576 A1* 5/2019 Rajadurai ........... H04L 63/0823
713/151

FOREIGN PATENT DOCUMENTS

CN 103699367 A 4/2014
CN 104468832 A 3/2015

OTHER PUBLICATIONS

Starsinic, Michael, Dale Seed, and Chonggang Wang. "An Overview of 3GPP Exposed Services for IoT Service Platforms." GetMobile: Mobile Computing and Communications 22, No. 2 (2018): 16-21. (Year: 2018).*

(Continued)

*Primary Examiner* — Oscar A Louie
*Assistant Examiner* — Melaku Y Habtemariam
(74) *Attorney, Agent, or Firm* — Leydig, Voit & Mayer, Ltd.

(57) ABSTRACT

This application provides a method and an apparatus for invoking an application programming interface (API), to determine a target exposing function network element used to invoke an API. The method includes: A first network element obtains routing information of an API, where the routing information is used to indicate a route for invoking the API, and the API is provided by a first exposing function network element and a second exposing function network element; the first network element obtains invocation parameter information of the API, where the invocation parameter information is used to handle the API; and the first network element determines a target exposing function network element in the first exposing function network element and the second exposing function network element based on the routing information and the invocation parameter information.

25 Claims, 7 Drawing Sheets

(58) Field of Classification Search
USPC .................................................. 709/217, 223
See application file for complete search history.

(56) References Cited

OTHER PUBLICATIONS

"3rd Generation Partnership Project; Technical Specification Group Services and System Aspects; Study on Common API Framework for 3GPP Northbound APIs (Release 15)," 3GPP TR 23.722 V2.0.0, total 65 pages, 3rd Generation Partnership Project, Valbonne, France (Dec. 2017).

"3rd Generation Partnership Project; Technical Specification Group Services and System Aspects; Functional architecture and information flows to support Common API Framework for 3GPP Northbound APIs; Stage 2 (Release 15)," 3GPP TS 23.222 V15.4.0, total 88 pages, 3rd Generation Partnership Project, Valbonne, France (Dec. 2018).

Huawei, Hisilicon, "API invocation request routing with topology hiding," 3GPP TSG-SA WG6 Meeting #28, Kochi, India, S6-190086, total 5 pages, 3rd Generation Partnership Project, Valbonne, France (Jan. 21-25, 2019).

"3rd Generation Partnership Project;Technical Specification Group Services and System Aspects; Application layer support for V2X services;Functional architecture and information flows; (Release 16)," 3GPP TS 23.286 V0.2.0, total 39 pages, 3rd Generation Partnership Project, Valbonne, France (Dec. 2018).

"3rd Generation Partnership Project;Technical Specification Group Services and System Aspects;Security aspects of Common API Framework (CAPIF) for 3GPP northbound APIs (Release 15)," 3GPP TS 33.122 V15.2.0, total 29 pages, 3rd Generation Partnership Project, Valbonne, France (Dec. 2018).

Samsung, "Pseudo-CR on TS 23.222 CAPIF access control cascaded AEFs," 3GPP TSG-SA WG6 Meeting #19, Dubrovnik, Croatia, S6-171363, total 4 pages, 3rd Generation Partnership Project, Valbonne, France (Oct. 9-13, 2017).

"3rd Generation Partnership Project;Technical Specification Group Core Network and Terminals; Cx and Dx interfaces based on the Diameter protocol; Protocol details (Release 15)," 3GPP TS 29.229 V15.0.0, total 41 pages, 3rd Generation Partnership Project, Valbonne, France (Jun. 2018).

Samsung, "Pseudo-CR on TS 23.222 CAPIF access control cascaded AEFs," 3GPP TSG-SA WG6 Meeting #19, Dubrovnik, Croatia, S6-171291, total 5 pages, 3rd Generation Partnership Project, Valbonne, France (Oct. 9-13, 2017).

Huawei, Hisilicon, "Topology hiding enhancement," 3GPP TSG-SA WG6 Meeting #26, Vilnius, Lithuania, S6-181585 total 2 pages, 3rd Generation Partnership Project, Valbonne, France (Oct. 15-19, 2018).

* cited by examiner

300

A first network element obtains routing information of an API, where the routing information is used to indicate a route for invoking the API, and the API is provided by a first exposing function network element and a second exposing function network element ~ S310

The first network element obtains invocation parameter information of the API, where the invocation parameter information is used to handle the API ~ S320

The first network element determines a target exposing function network element in the first exposure function network element and the second exposure function network element based on the routing information and the invocation parameter information ~ S330

FIG. 3

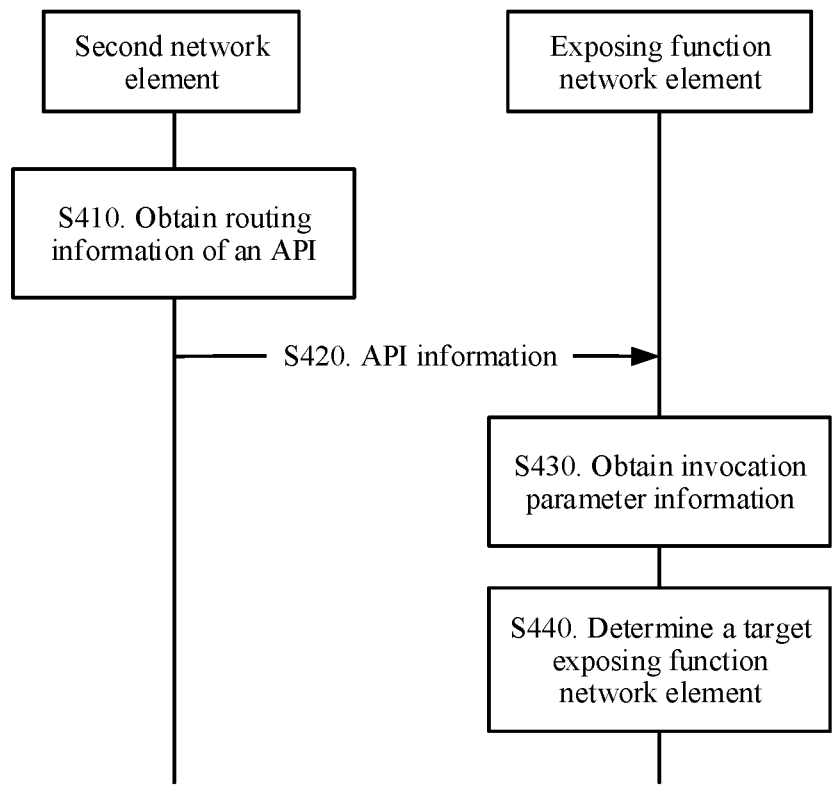

FIG. 4

METHOD AND APPARATUS FOR INVOKING APPLICATION PROGRAMMING INTERFACE

CROSS-REFERENCE TO RELATED APPLICATIONS

This application is a continuation of International Patent Application No. PCT/CN2019/129786, filed on Dec. 30, 2019, which claims priority to Chinese Patent Application No. 201910033239.1, filed on Jan. 14, 2019. The disclosures of the aforementioned applications are hereby incorporated by reference in their entireties.

TECHNICAL FIELD

This application relates to the communication field, and in particular, to a method and an apparatus for invoking an application programming interface (application programmers interface, API) in the communication field.

BACKGROUND

A common API framework (CAPIF) generally includes an API invoker, a CAPIF core function (CCF) network element, an API exposing function (AEF) network element, an API publishing function (APF) network element, and an API management function (APIMF) network element. The API invoker is generally a third-party application that signs a service agreement with an operator, and has a capability of invoking an API. The AEF provides the API, and acts as an entry for the API invoker to invoke the API. The APF provides a function of publishing the API, and publishes the API in the CCF. The CCF stores the API published by the APF, so that the API invoker can discover the API and invoke the API. The APIMF provides a function of managing the API.

When deploying the CAPIF, the CCF may determine to use a topology hiding policy on the API, that is, select a topology hiding entry point AEF (generally referred to as a border AEF) for the API. In this case, when the API invoker invokes the API, the border AEF may determine an AEF that actually provides the API, and send an API invocation request to the AEF. In a scenario in which an API is provided by only one AEF, the border AEF may determine, based on an identifier of the API, an AEF that actually provides the API, and directly send the API invocation request to the AEF that actually provides the API. However, in a scenario in which an API may be provided by a plurality of AEFs, when the API is provided to the API invoker and the CCF applies the topology hiding policy to the API, the border AEF cannot determine a specific AEF that is in the plurality of AEFs that provide the API and to which the API invocation request should be sent. Consequently, the API fails to be invoked.

SUMMARY

This application provides a method and an apparatus for invoking an application programming interface, to determine a target exposing function network element used to invoke an API, in a scenario in which the API is provided by a plurality of exposing function network elements, thereby successfully invoking the API.

According to a first aspect, a method for invoking an application programming interface is provided. The method includes: A first network element obtains routing information of an API, where the routing information is used to indicate a route for invoking the API, and the API is provided by a first exposing function network element and a second exposing function network element; the first network element obtains invocation parameter information of the API, where the invocation parameter information is used to handle the API; and the first network element determines a target exposing function network element in the first exposing function network element and the second exposing function network element based on the routing information and the invocation parameter information.

According to the method for invoking an application programming interface in this embodiment of this application, in a scenario in which an API is provided by a plurality of exposing function network elements, a target exposing function network element used to invoke the API can be determined with reference to routing information of the API and invocation parameter information of the API. In this way, a border exposing function network element forwards an API invocation request to the target exposing function network element, and successfully invokes the API.

In this embodiment, the first network element may be a core function network element, a publishing function network element, or an exposing function network element (that is, a border exposing function network element that can receive an API invocation request of an API invoker).

With reference to the first aspect, in certain embodiments of the first aspect, the invocation parameter information includes identification information of a terminal device and/or location information of the terminal device; and/or the routing information includes information about the first exposing function network element, information about the second exposing function network element, information about a first serving area corresponding to the API, and information about a second serving area corresponding to the API, where the API provided by the first exposing function network element corresponds to the first serving area, and the API provided by the second exposing function network element corresponds to the second serving area.

With reference to the first aspect, in certain embodiments of the first aspect, the first network element is a core function network element, and that the first network element obtains invocation parameter information of the API includes: The first network element receives the invocation parameter information of the API from a border exposing function network element. The method further includes: The first network element sends information about the target exposing function network element to the border exposing function network element.

For example, the first network element is a core function network element, and the core function network element may receive the invocation parameter information of the API from the border exposing function network element. Further, after determining the target exposing function network element based on the routing information and the invocation parameter information of the API, the core function network element may send the information about the target exposing function network element to the border exposing function network element, so that the border exposing function network element sends the API invocation request from the API invoker to the target exposing function network element.

With reference to the first aspect, in certain embodiments of the first aspect, the first network element is the core function network element, and that a first network element obtains routing information of an API includes: The first network element receives the routing information of the API from a publishing function network element.

In an optional embodiment, the first network element is the core function network element, and that a first network element obtains routing information of an API may be: The first network element determines the routing information of the API in locally preconfigured AEF information.

With reference to the first aspect, in certain embodiments of the first aspect, the first network element is a publishing function network element, and the publishing function network element may locally obtain the API information.

With reference to the first aspect, in certain embodiments of the first aspect, the first network element is the core function network element, and the method further includes: The first network element receives the information about the first exposing function network element, the information about the second exposing function network element, the information about the first serving area, and the information about the second serving area from a publishing function network element, where the API provided by the first exposing function network element corresponds to the first serving area, and the API provided by the second exposing function network element corresponds to the second serving area. That a first network element obtains routing information of an API includes: The first network element generates the routing information of the API based on the information about the first exposing function network element, the information about the second exposing function network element, the information about the first serving area, and the information about the second serving area.

For example, the first network element is the core function network element, and the first network element may generate the routing information of the API based on the information about the first exposing function network element, the information about the second exposing function network element, the information about the first serving area, and the information about the second serving area that are received. Optionally, the routing information may indicate a correspondence between the first serving area and the first exposing function network element, and a correspondence between the second serving area and the second exposing function network element.

With reference to the first aspect, in certain embodiments of the first aspect, the first network element is a border exposing function network element, and that a first network element obtains routing information of an API includes: The first network element receives the routing information of the API from a core function network element or a publishing function network element.

For example, if the first network element is a border exposing function network element, the border exposing function network element may receive the routing information of the API from the core function network element or the publishing function network element. For example, if there is an interface between the border exposing function network element and the publishing function network element, the publishing function network element may directly send the routing information of the API to the border exposing function network element through the interface. For example, if there is no interface between the border exposing function network element and the publishing function network element, the publishing function network element may send the routing information of the API to the core function network element, and then the core function network element sends the API information to the border exposing function network element.

With reference to the first aspect, in certain embodiments of the first aspect, the method further includes: The first network element sends a request message, where the request message is used to request the routing information of the API, and the request message includes identification information of the API.

For example, the first network element is a border exposing function network element, and the border exposing function network element may further send a request message to the core function network element or the publishing function network element, to request the routing information of the API. Because the routing information is for a specific API, the request message may further include identification information of the requested API. Generally, the border exposing function network element sends the foregoing request message to the core function network element or the publishing function network element after receiving the API invocation request from the API invoker, where an API corresponding to the routing information requested by the request message is the API that the API invocation request requests to invoke.

In this embodiment of this application, the border exposing function network element requests the routing information from the core function network element only when the border exposing function network element receives the API invocation request, rather than that the core function network element actively sends the routing information to the border exposing function network element. This prevents a waste of push signaling and related information caused when the border exposing function network element obtains but does not use the routing information.

According to a second aspect, another method for invoking an application programming interface is provided. The method includes: A second network element obtains routing information of an API, where the routing information is used to indicate a route for invoking the API, and the API is provided by a first exposing function network element and a second exposing function network element; and the second network element sends the routing information to a border exposing function network element, where the routing information is used by the border exposing function network element to determine a target exposing function network element, and the target exposing function network element is determined in the first exposing function network element and the second exposing function network element.

With reference to the second aspect, in certain embodiments of the second aspect, the routing information includes information about the first exposing function network element that provides the API, information about the second exposing function network element that provides the API, information about a first serving area corresponding to the API, and information about a second serving area corresponding to the API, where the API provided by the first exposing function network element corresponds to the first serving area, and the API provided by the second exposing function network element corresponds to the second serving area.

With reference to the second aspect, in certain embodiments of the second aspect, the second network element is a core function network element, and the method further includes: The second network element receives the information about the first exposing function network element, the information about the second exposing function network element, the information about the first serving area corresponding to the API, and the information about the second serving area corresponding to the API from a publishing function network element, where the API provided by the first exposing function network element corresponds to the first serving area, and the API provided by the second exposing function network element corresponds to the second serving area. That a second network element obtains routing information of an API includes: The second network element generates the routing information of the API based on the information about the first exposing function network element, the information about the second exposing function network element, the information about the first serving area, and the information about the second serving area.

With reference to the second aspect, in certain embodiments of the second aspect, before the second network element sends the routing information to the border exposing function network element, the method further includes: The second network element receives a request message from the border exposing function network element, where the request message is used to request the routing information, and the request message includes identification information of the API. That the second network element sends the routing information to a border exposing function network element includes: The second network element sends the routing information to the border exposing function network element based on the request message.

According to a third aspect, a method for invoking an application programming interface is provided. The method includes: A first network element obtains API information, where the API information includes information about a first exposing function network element that provides an API, information about a second exposing function network element that provides the API, information about a first serving area corresponding to the API, and information about a second serving area corresponding to the API, where the API provided by the first exposing function network element corresponds to the first serving area, and the API provided by the second exposing function network element corresponds to the second serving area; the first network element obtains invocation parameter information of the API, where the invocation parameter information includes identification information of a terminal device and/or location information of the terminal device; and the first network element determines a target exposing function network element in the first exposing function network element and the second exposing function network element based on the API information and the invocation parameter information.

According to the method for invoking an application programming interface in this embodiment of this application, in a scenario in which an API is provided by a plurality of exposing function network elements, a target exposing function network element used to invoke the API can be determined with reference to information about serving areas corresponding to the API, the plurality of exposing function network elements that provide the API, and invocation parameter information of the API. In this way, a border exposing function network element forwards an API invocation request to the target exposing function network element, and successfully invokes the API.

In this embodiment, the first network element may be a core function network element, a publishing function network element, or an exposing function network element (that is, a border exposing function network element that can receive an API invocation request of an API invoker).

With reference to the third aspect, in certain embodiments of the third aspect, the first network element is a core function network element, and that the first network element obtains invocation parameter information of the API includes: The first network element receives the invocation parameter information of the API from a border exposing function network element. The method further includes: The first network element sends information about the target exposing function network element to the border exposing function network element.

For example, the first network element is a core function network element, and the core function network element may receive the invocation parameter information of the API from the border exposing function network element. Further, after determining the target exposing function network element based on the API information and the invocation parameter information, the core function network element may send the information about the target exposing function network element to the border exposing function network element, so that the border exposing function network element sends the API invocation request from the API invoker to the target exposing function network element.

With reference to the third aspect, in certain embodiments of the third aspect, the first network element is the core function network element, and that a first network element obtains API information includes: The first network element receives the API information from a publishing function network element.

With reference to the third aspect, in certain embodiments of the third aspect, the first network element is a publishing function network element, and the publishing function network element may locally obtain the API information. This is not limited in this embodiment of this application.

With reference to the third aspect, in certain embodiments of the third aspect, the first network element is a border exposing function network element, and that a first network element obtains API information includes: The first network element receives the API information from a core function network element or a publishing function network element.

For example, if the first network element is a border exposing function network element, the border exposing function network element may receive the API information from the core function network element or the publishing function network element. For example, if there is an interface between the border exposing function network element and the publishing function network element, the publishing function network element may directly send the API information to the border exposing function network element through the interface. For example, if there is no interface between the border exposing function network element and the publishing function network element, the publishing function network element may send the API information to the core function network element, and then the core function network element sends the API information to the border exposing function network element.

With reference to the third aspect, in certain embodiments of the third aspect, the method further includes: The first network element generates an invocation routing rule of the API based on the API information, where the invocation routing rule is used to indicate a route for invoking the API. That the first network element determines a target exposing function network element in the first exposing function network element and the second exposing function network element based on the API information and the invocation parameter information includes: The first network element determines the target exposing function network element in the first exposing function network element and the second exposing function network element based on the invocation routing rule and the invocation parameter information.

It should be understood that the invocation routing rule herein may be included in the routing information in the first aspect and the second aspect. However, this is not limited in this application. For example, the first network element (the core function network element, the border exposing function network element, the publishing function network element, or the like) may generate the invocation routing rule of the API based on the API information. In this case, the first network element may determine the target exposing function network element based on the generated invocation routing rule and the invocation parameter information. Optionally, the invocation routing rule may indicate a correspondence between the first serving area and the first exposing function network element, and a correspondence between the second serving area and the second exposing function network element.

With reference to the third aspect, in certain embodiments of the third aspect, the first network element is a border exposing function network element, and the method further includes: The first network element sends a request message, where the request message is used to request the invocation routing rule of the API, and the request message includes identification information of the API.

For example, the first network element is a border exposing function network element, and the border exposing function network element may further send a request message to the core function network element or the publishing function network element, to request the invocation routing rule of the API. Because the invocation routing rule is for a specific API, the request message may further include identification information of the requested API. Generally, the border exposing function network element sends the foregoing request message to the core function network element or the publishing function network element after receiving the API invocation request from the API invoker, where an API corresponding to the invocation routing rule requested by the request message is the API that the API invocation request requests to invoke.

In this embodiment of this application, the border exposing function network element requests the invocation routing rule from the core function network element only when the border exposing function network element receives the API invocation request, rather than that the core function network element actively sends the invocation routing rule to the border exposing function network element. This prevents a waste of push signaling and related information caused when the border exposing function network element obtains but does not use the invocation routing rule.

According to a fourth aspect, another method for invoking an application programming interface is provided. The method includes: A second network element obtains API information, where the API information includes information about a first exposing function network element that provides an API, information about a second exposing function network element that provides the API, information about a first serving area corresponding to the API, and information about a second serving area corresponding to the API, where the API provided by the first exposing function network element corresponds to the first serving area, and the API provided by the second exposing function network element corresponds to the second serving area; and the second network element sends the API information to a border exposing function network element, where the API information is used by the border exposing function network element to determine a target exposing function network element, and the target exposing function network element is determined in the first exposing function network element and the second exposing function network element.

With reference to the fourth aspect, in certain embodiments of the fourth aspect, the method further includes: The second network element generates an invocation routing rule of the API based on the API information, where the invocation routing rule is used to indicate a route for invoking the API; and the second network element sends the invocation routing rule to the border exposing function network element.

With reference to the fourth aspect, in certain embodiments of the fourth aspect, before the second network element sends the invocation routing rule to the border exposing function network element, the method further includes: The second network element receives a request message from the border exposing function network element, where the request message is used to request the invocation routing rule, and the request message includes identification information of the API. That the second network element sends the invocation routing rule to the border exposing function network element includes: The second network element sends the invocation routing rule to the border exposing function network element based on the request message.

According to a fifth aspect, an apparatus is provided. The apparatus is configured to perform the method in any one of the foregoing aspects or the possible implementations of the foregoing aspects. Specifically, the apparatus includes units configured to perform the method in any one of the foregoing aspects or the possible implementations of the foregoing aspects.

According to a sixth aspect, an apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control a receiver to receive a signal and control a transmitter to send a signal. When the processor executes the instructions stored in the memory, the execution enables the processor to perform the method in any one of the foregoing aspects or the possible implementations of the foregoing aspects.

According to a seventh aspect, a computer program product is provided. The computer program product includes computer program code. When the computer program code is run by a computing device, the computing device is enabled to perform the method in any one of the foregoing aspects or the possible implementations of the foregoing aspects.

According to an eighth aspect, a computer-readable medium is provided. The computer-readable medium is configured to store a computer program. The computer program includes instructions used to perform the method in any one of the foregoing aspects or the possible implementations of the foregoing aspects.

According to a ninth aspect, a chip is provided. The chip includes a processor, configured to invoke a computer program from a memory and run the computer program, to enable an apparatus in which the chip is installed to perform the method in any one of the foregoing aspects or the possible implementations of the foregoing aspects.

BRIEF DESCRIPTION OF DRAWINGS

FIG. 3 is a schematic flowchart of a method for invoking an application programming interface according to an embodiment of this application;

FIG. 4 is a schematic flowchart of another method for invoking an application programming interface according to an embodiment of this application;

DESCRIPTION OF EMBODIMENTS

Figure 1:
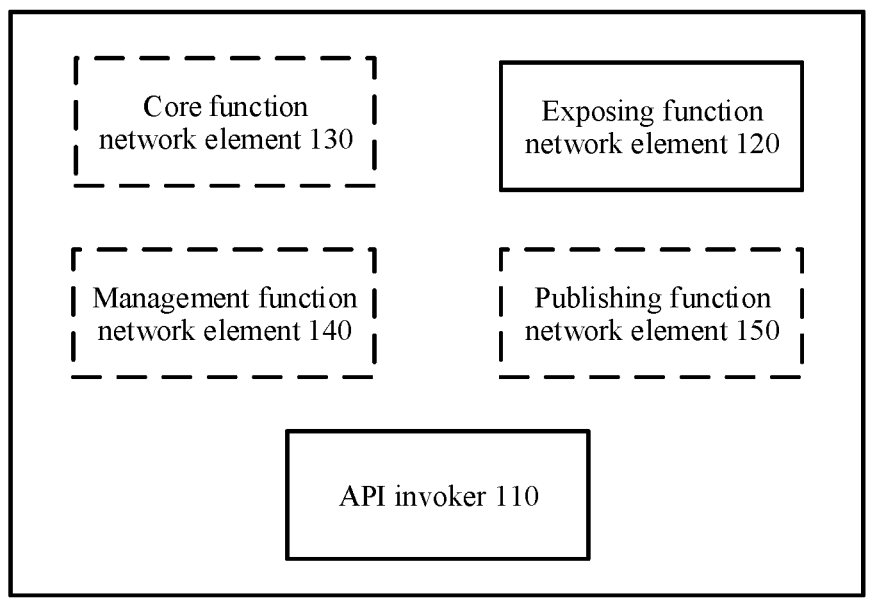
FIG. 1 is a schematic diagram of a system architecture according to an embodiment of this application.

The following describes technical solutions in this application with reference to the accompanying drawings.

The technical solutions in the embodiments of this application may be used in various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS) system, a worldwide interoperability for microwave access (WiMAX) communication system, and a 5th generation (5G) system or new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a windows operating system. The application layer includes applications such as a browser, an address book, word processing software, and instant communication software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

In the embodiments of this application, service APIs or APIs are APIs provided by an AEF entity, and may be discovered and invoked by an API invoker. The APIs mainly include APIs of some specific service types, for example, an API of a quality of service (QoS) control type, an API of a broadcast type, and an API of an internet of things (IoT) type, and may be used by the API invoker to use a resource and a service provided by an operator.

FIG. 1 is a schematic diagram of a system architecture 100 applicable to the embodiments of this application. As shown in FIG. 1, the system architecture 100 includes an API invoker 110 and an exposing function network element 120. The API invoker 110 has a capability of invoking an API. The exposing function network element 120 provides the API and also acts as an entry for the API invoker to invoke the API.

Optionally, the system architecture 100 may further include at least one of a core function network element 130, a management function network element 140, and a publishing function network element 150. For example, the publishing function network element 150 provides a function of publishing the API, and publishes the API in the core function network element 130. The core function network element 130 stores the API published by the publishing function network element 150, so that the API invoker 110 can discover the API and invoke the API. The management function network element 140 provides a function of managing the API.

Optionally, the network elements in the system architecture 100 may be implemented by one device, or may be implemented jointly by a plurality of devices, or may be a functional module in a device. This is not specifically limited in this embodiment of this application. It may be understood that the foregoing functions may be network elements in a hardware device, or may be software functions running on dedicated hardware, or may be virtualization functions instantiated on a platform (for example, a cloud platform).

Figure 2:
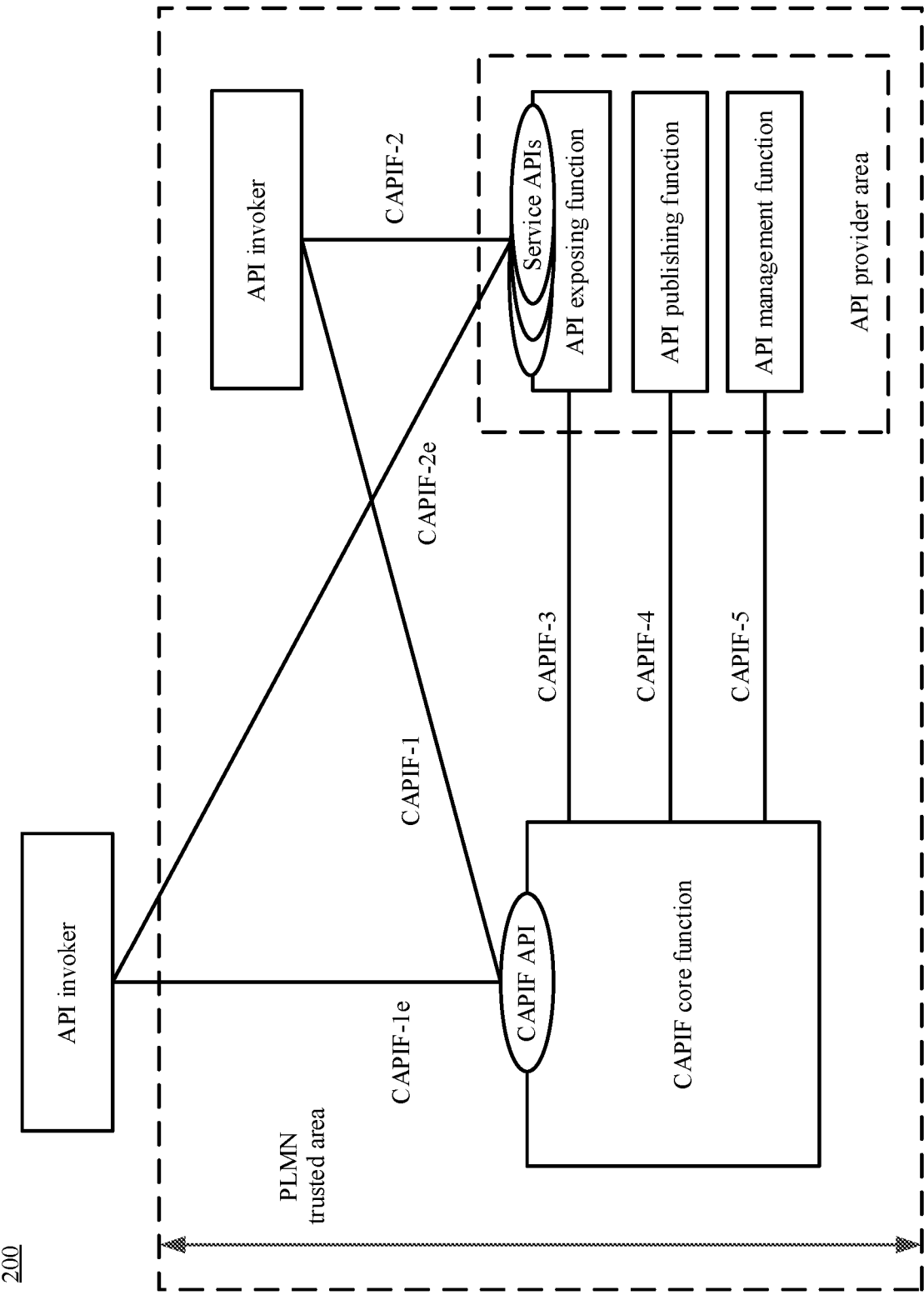
FIG. 2 is a schematic diagram of another system architecture according to an embodiment of this application.

FIG. 2 shows another system architecture 200 according to an embodiment of this application. As shown in FIG. 2, the system architecture 200 may specifically include the following network elements:

1. API Invoker (API Invoker)

The API invoker may also be referred to as an API invoker entity, and is generally a third-party application, for example, a machine to machine (machine to machine, M2M) application, an internet of things (internet of things, IoT) application, and a vehicle to everything (vehicle to everything, V2X) application that signs a service agreement with an operator, or may be an application of the operator. Such applications may run in a terminal device, or may run in a network device.

In addition, the API invoker may alternatively be a device in a PLMN network, for example, a mobility management entity (MME), a radio access network (RAN), a policy and charging rules function (PCRF), an application network element (AF), or a home subscriber server (HSS) in an LTE communication system. For another example, the API invoker may be an authentication management function (APIMF) network element, a session management function (SMF) network element, a user plane function (UPF) network element, a user data management (UDM) network element, a policy control function (PCF) network element, a network repository function (NRF), a network exposure function (NEF), and an application function (AF) in a 5G communication system. The API invoker and a PLMN operator may be located in a same trusted domain, or may not be located in a same trusted domain. This is not limited in this embodiment of this application.

2. CAPIF Core Function (CCF) Network Element

The CCF mainly has the following functions: (1) authenticating the API invoker based on an identifier of the API invoker and other information; (2) supporting mutual authentication between the CCF and the API invoker; (3) providing the API invoker with authorization before the API invoker invokes the API; (4) supporting API publishing, API storage, and API discovery; (5) being responsible for access control of the API based on policies of a PLMN operator; (6) storing API invocation logs and providing the logs to an authorization entity; (7) performing charging based on the API logs; (8) monitoring API invocation; (9) registering the API invoker; (10) storing a configuration policy; and (11) supporting audit of the invocation and the logs.

In the LTE communication system, the CCF may be independently deployed in a physical device, or may be deployed together with another entity, for example, deployed in a service capability exposure function (SCEF). In the 5G communication system, the CCF may be independently deployed in a physical device, or may be deployed together with another entity, and attempts to be deployed in the NEF.

3. API Exposing Function (AEF) Network Element

The AEF provides the API, and is an entry for the API invoker to invoke the API. The AEF mainly includes the following functions: (1) authenticating the API invoker based on the identifier of the API invoker and other information provided by the CCF; (2) confirming the authorization provided by the CCF; and (3) synchronizing the API logs to the CCF.

The AEF may be deployed in the NEF; the AEF may be the APIMF, the SMF, the UDM, the PCF, the NRF, the NEF, or the like; the AEF may be deployed in the SCEF; or the AEF may be the MME, the PCRF, or the like, and is used for exposure of a network capability inside the PLMN.

4. API Publishing Function (APF) Network Element

The APF provides the API publishing function, so that the API invoker can discover the API.

5. API Management Function (APIMF) Network Element

The APIMF manages the API, and mainly has the following functions: (1) auditing the API invocation logs provided by the CCF; (2) monitoring an event reported by the CCF; (3) configuring an API provider policy for the API; (4) monitoring a status of the API; and (5) registering the API invoker.

It should be understood that in the foregoing system architecture 100, the API invoker 110 may specifically correspond to the API invoker in FIG. 2, the exposing function network element 120 may specifically correspond to the AEF in FIG. 2, the core function network element 130 may specifically correspond to the CCF in FIG. 2, the management function network element 140 may specifically correspond to the APIMF in FIG. 2, and the publishing function network element 150 may specifically correspond to the APF in FIG. 2.

It should be understood that the foregoing application scenario 200 applied to the embodiments of this application is merely an example of a network architecture described from a perspective of a service architecture, and a network architecture applicable to the embodiments of this application is not limited thereto. Any network architecture that can implement functions of the network elements is applicable to the embodiments of this application.

It should be noted that names of interfaces between the network elements in FIG. 2 are only examples, and the interfaces may have other names in specific implementation. This is not specifically limited in the embodiments of this application. For example, the API invoker is connected to the CCF network element through a CAPIF-1 or CAPIF-1e interface. The API invoker is connected to the AEF network element through a CAPIF-2 or CAPIF-2e interface. The CCF network element is connected to the AEF network element through a CAPIF-3 interface. The CCF network element is connected to the APF network element through a CAPIF-4 interface. The CCF network element is connected to the APIMF network element through a CAPIF-5 interface. AEF network elements may be connected to each other through the CAPIF-2 interface, or a CAPIF-2i interface which is not shown in FIG. 2 (herein, "i" means internal).

It should be noted that names of the network elements (such as the CCF, the APF, and the AEF) included in FIG. 2 are also merely examples, and do not constitute any limitation on the functions of the network elements. In a 5G network and another future network, the foregoing network elements may alternatively have other names. This is not specifically limited in the embodiments of this application.

For example, in a 6G network, some or all of the foregoing network elements may use terms in 5G, or may use other names. This is uniformly described herein. Details are not described in the following. In addition, it should be understood that names of messages (or signaling) transmitted between the foregoing network elements are also merely examples, and do not constitute any limitation on functions of the messages.

The following first describes three procedures related to API invocation with reference to the foregoing system architecture 200.

1. API Publishing Procedure

Step 1: The APF sends an API publishing request message to the CCF, where the API publishing request message includes information about an API, and may specifically include an API name, and information about an AEF that provides the API (for example, an AEF identifier, a version number, a protocol used by the API, a data format, interface descriptions (an IP address, a port number, and a security method), API description information, and features supported by the API).

Step 2: The CCF receives the API publishing request message from the APF, and checks whether the APF is authorized to publish the API. If the APF is authorized to publish the API, the CCF stores the information that is about the API and that is received from the APF.

Step 3: The CCF returns an API publishing response message to the APF, where the API publishing response message is used to indicate that the API is successfully published or the API fails to be published. In addition, the CCF may further send a notification message to a subscribed API invoker, to notify the API invoker that there is a new API or an API in which the API invoker is interested.

2. API Discovery Procedure

If the API invoker has logged in and an identifier of the API invoker exists, and the CCF has configured a discovery policy for the API invoker, the following steps may be performed:

Step 1: The API invoker sends an API discovery request message to the CCF, where the API discovery request message includes the identifier of the API invoker and a discovery filtering condition.

Step 2: The CCF receives the API discovery request message from the API invoker, and authenticates an identity of the API invoker based on the identifier of the API invoker. If the API invoker is authenticated, the CCF searches for information about a published API based on the foregoing discovery filtering condition and policy information of the API invoker.

Step 3: The CCF sends an API discovery response message to the API invoker, where the API discovery response message includes information about an API allowed to be used by the API invoker. It should be understood that the information about the API may be information about one API or information about a plurality of APIs.

3. API invocation procedure

Step 1: The API invoker sends an API invocation request message to the AEF, where the API invocation request message includes the identifier of the API invoker and the information about the API (for example, an identifier of the API).

Step 2: The AEF receives the API invocation request message from the API invoker, and authenticates the identity of the API invoker based on the identifier of the API invoker. If the API invoker is authenticated, the AEF executes corresponding API logic.

Step 3: The AEF sends an API invocation response message to the API invoker.

It should be understood that, if the AEF is an AEF that actually provides the API (which may be understood as a destination AEF that handles the API), logic of the AEF for invoking the API is as follows: The AEF provides the API for the API invoker. If the AEF is not an AEF that actually provides the API, logic of the AEF for invoking the API is as follows: The AEF sends the API invocation request message to the AEF that actually provides the API. This is because when the CAPIF is deployed, the CCF may determine to use a topology hiding policy on the API, that is, select a topology hiding entry point AEF (generally referred to as a border AEF) for the API. In this case, when the API invoker invokes the API, the border AEF may determine the AEF that actually provides the API, and send the API invocation request message to the AEF.

Specifically, in the foregoing API publishing procedure, the APF sends the API publishing request message to the CCF, and the CCF stores the information that is about the API and that is included in the API publishing request message, and determines to apply the topology hiding policy to the API that the APF requests to publish. In this case, the CCF may select an AEF as the border AEF of the API. The CCF sends an API topology hiding notification message to the border AEF, where the API topology hiding notification message is used in forwarding of the API invocation request, and the forwarding may be performed later. The API topology hiding notification message includes the information about the API and the information about the AEF that provides the API. The border AEF receives the topology hiding notification message from the CCF, and stores the information in the topology hiding notification message. The CCF sends an API publishing response message to the APF.

It should be understood that the topology hiding policy may be applied to all API invokers, or may be applied to some API invokers.

Because the topology hiding policy is applied, the CCF needs to change the information about the AEF that actually provides the API to information about the border AEF, correspondingly modify interface information thereof, and provide the interface information to the API invoker in the API discovery procedure. In this case, the API invoker obtains the border AEF and the interface information thereof. The API invoker can send the API invocation request only to the border AEF. In a scenario in which an API is provided by only one AEF, the border AEF may determine, based on an identifier of the API, an AEF that actually provides the API, and directly send the API invocation request to the AEF that actually provides the API.

In a scenario in which an API may be provided by a plurality of AEFs (that is, a plurality of AEFs may provide a same API), the border AEF may obtain, after the API publishing procedure, information about the plurality of AEFs that provide the API. It should be understood that an API or a same API in this application is an API with a same API name and/or a same API function. If the CCF does not apply the topology hiding policy to the API, the API invoker may obtain the information about the plurality of AEFs that provide the API, and the API invoker may decide a specific AEF to be used and interface information thereof. If the CCF applies the topology hiding policy to the API, the API invoker can send the API invocation request only to the border AEF, but the border AEF cannot determine a specific AEF in the plurality AEFs that provide the API and to which the API invocation request should be sent. Consequently, the API fails to be invoked.

In view of this, the embodiments of this application provide a new API invocation method. In a scenario in which an API is provided by a plurality of exposing function network elements, a target AEF used to invoke the API can be determined with reference to routing information of the API and invocation parameter information (for example, an identifier and/or a location of a terminal device) of the API, so that the border AEF forwards the API invocation request to the target AEF, and invokes the API.

FIG. 3 is a schematic flowchart of a method 300 for invoking an application programming interface according to an embodiment of this application. The method 300 may be applied to the communication system 100 shown in FIG. 1, or may be applied to the communication system 200 shown in FIG. 2. This is not limited in this embodiment of this application.

S310. A first network element obtains routing information of an API, where the routing information is used to indicate a route for invoking the API, and the API is provided by a first exposing function network element and a second exposing function network element.

For example, the API is provided by a plurality of exposing function network elements. The plurality of exposing function network elements include the first exposing function network element and the second exposing function network element.

Optionally, the routing information of the API includes information about the first exposing function network element that provides the API, information about the second exposing function network element that provides the API, information about a first serving area corresponding to the API, and information about a second serving area corresponding to the API, where the API provided by the first exposing function network element corresponds to the first serving area, and the API provided by the second exposing function network element corresponds to the second serving area.

S320. The first network element obtains invocation parameter information (an application user or an application client) of the API, where the invocation parameter information is used to handle the API.

The handling (handle) the API may be understood as performing, based on detailed information of an API invocation request, an operation (operation) on a resource (resource) corresponding to the API. The following uses a protocol data unit (protocol data unit, PDU) session service API as an example for description. An operation allowed by the API includes creation (create), update, releasing (release), and the like. The API includes a resource, and is identified by a uniform resource locator which may be, for example, {cmcc.smfapi.com}/{PDU Session}/{v1}. The invocation parameter information may include an object corresponding to the resource, and may be used as an input parameter required by the API. The invocation parameter information is, for example, an identifier of a terminal device, indicating that a PDU session service is provided for the terminal device with the identifier. In an example of handling the API, for example, creating a PDU session for a user 1, it may be understood that an AEF that provides the API creates a session for the user 1 in a resource directory of the API. After the handling, the resource directory may be updated to {cmcc.smfapi.com}/{PDU Session}/{v1}/{user 1}.

Optionally, the invocation parameter information includes identification information of a terminal device and/or location information of the terminal device.

S330. The first network element determines a target exposing function network element in the first exposing function network element and the second exposing function network element based on the routing information and the invocation parameter information.

According to the method for invoking an application programming interface in this embodiment of this application, in a scenario in which an API is provided by a plurality of exposing function network elements, a target exposing function network element used to invoke the API can be determined in the plurality of exposing function network elements with reference to routing information of the API and invocation parameter information of the API. In this way, a border exposing function network element forwards an API invocation request to the target exposing function network element, and successfully invokes the API.

In this embodiment, the first network element may be a core function network element, a publishing function network element, or an exposing function network element (that is, a border exposing function network element that can receive an API invocation request of an API invoker). This is not limited in this embodiment of this application.

The determining a target exposing function network element in the first exposing function network element and the second exposing function network element means that the determined target exposing function network element is either of the first exposing function network element and the second exposing function network element. In other words, the target exposing function network element is the first exposing function network element or the second exposing function network element.

For example, an API is provided by a plurality of exposing function network elements. The API provided by different exposing function network elements in the plurality of exposing function network elements may correspond to different serving areas. In other words, there is a correspondence between the plurality of serving areas corresponding to the API and the plurality of exposing function network elements. For ease of understanding and description, this embodiment is described by using an example in which the plurality of exposing function network elements that provide the API include the first exposing function network element and the second exposing function network element, and the plurality of serving areas corresponding to the API include the first serving area and the second serving area. It may be understood that all APIs mentioned in this application are a same API, and details are not described subsequently. The API provided by the first exposing function network element corresponds to the first serving area, and the API provided by the second exposing function network element corresponds to the second serving area.

A serving area indicates a serving range of the API provided by an exposing function network element. For example, if the serving area is represented by a domain name, for example, cmcc.beijing.com, it indicates that the API may provide a service for a user (a terminal device or an application client) in the serving area. For example, if the serving area is represented by an IP address segment, for example, 10.11.1.0 to 10.11.1.255, it indicates that the API may provide a service for a user (a terminal device or an application client) whose IP address is in the address range. For example, if the serving area is represented by an IP address prefix, it indicates that the API may provide a service for a user (a terminal device or an application client) having the IP address prefix. For example, if the serving area is represented by location area information, it indicates that the API may provide a service for a user (a terminal device or an application client) whose current location is in the area.

In addition, that an exposing function network element provides the API may be understood as that the exposing function network element handles (handle) the API. For example, the exposing function network element may specifically perform an operation such as creation, modification, deletion, query, or the like on a resource corresponding to the API. Information about the exposing function network element that provides the API may be interface information of the API. The interface information of the API may include an IP address and/or port number information of the exposing function network element, a uniform resource identifier (unified resource identifier, URI) of an API resource, and the like.

In this case, the first network element may obtain the information about the exposing function network element that provides the API and information about the serving area of the API corresponding to the exposing function network element, and then with reference to the invocation parameter information of the API (for example, identification information and/or location information of a terminal device (a subscriber, an application user, or an application client)), the first network element may determine, in the first exposing function network element and the second exposing function network element, a target exposing function network element that can actually provide the API in an area corresponding to the terminal device.

For example, a terminal device is used as an example for description. Identification information of the terminal device may be an ID of the terminal device, for example, a 3GPP subscriber identifier or a device identifier, or an IP address of the terminal device. Location information of the terminal device may be an IP address of the terminal device, information about an area (area) in which the terminal device is located, or information about a current location of the terminal device. It should be understood that the foregoing terminal device is a terminal device corresponding to the API, that is, the API invoker invokes the API to serve the terminal device. In other words, the API is invoked by the API invoker for the terminal device, or the terminal device is an operation object of invocation of the API. For example, the API invoker invokes the API to obtain the information about the terminal device.

In an optional embodiment, the first network element is a core function network element, and that the first network element obtains invocation parameter information of the API includes: The first network element receives the invocation parameter information of the API from a border exposing function network element. The method further includes: The first network element sends information about the target exposing function network element to the border exposing function network element.

For example, the first network element is a core function network element, and the core function network element may receive the invocation parameter information of the API from the border exposing function network element. Further, after determining the target exposing function network element based on the routing information and the invocation parameter information of the API, the core function network element may send the information about the target exposing function network element to the border exposing function network element, so that the border exposing function network element sends the API invocation request from the API invoker to the target exposing function network element.

For example, the border exposing function network element may send the foregoing invocation parameter information to the core function network element by using a service API invocation routing request message (service API invocation routing request), a obtain topology hiding policy request (obtain topology hiding policy request), or a message sent by another border AEF to the CCF. A specific message name is not limited in this embodiment of this application. For example, the core function network element may feed back the information about the target exposing function network element to the border exposing function network element by using a service API invocation routing response message (service API invocation routing response), a obtain topology hiding policy response message (obtain topology hiding policy response), an API topology hiding notify message (API topology hiding notify), or a message sent by another CCF to the border AEF. A specific message name is not limited in this embodiment of this application.

In an optional embodiment, the first network element is the core function network element, and that a first network element obtains routing information of an API includes: The first network element receives the routing information of the API from a publishing function network element. That is, the core function network element may receive the routing information of the API from the publishing function network element.

In an optional embodiment, the first network element is the core function network element, and that a first network element obtains routing information of an API may be: The first network element determines the routing information of the API in locally preconfigured AEF information.

In another optional embodiment, the first network element is a publishing function network element, and the publishing function network element may locally obtain the routing information of the API from the publishing function network element. This is not limited in this embodiment of this application.

In an optional embodiment, the first network element is the core function network element, and the method further includes: The first network element receives the information about the first exposing function network element, the information about the second exposing function network element, the information about the first serving area corresponding to the API, and the information about the second serving area corresponding to the API from a publishing function network element, where the API provided by the first exposing function network element corresponds to the first serving area, and the API provided by the second exposing function network element corresponds to the second serving area. That a first network element obtains routing information of an API includes: The first network element generates the routing information of the API based on the information about the first exposing function network element, the information about the second exposing function network element, the information about the first serving area, and the information about the second serving area.

For example, the first network element is the core function network element, and the first network element may generate the routing information of the API based on the information about the first exposing function network element, the information about the second exposing function network element, the information about the first serving area, and the information about the second serving area (which are collectively referred to as API information in this specification) that are received.

Optionally, the routing information may indicate a correspondence between the first serving area and the first exposing function network element, and a correspondence between the second serving area and the second exposing function network element.

The routing information of the API may also be referred to as an "invocation routing rule of the API" in this embodiment of this application. A name of the routing information is not limited in this application. It should be understood that the invocation routing rule may be specifically represented in a form of a table, a formula, or the like. A specific representation form of the invocation routing rule is not limited in this application.

In an optional embodiment, the first network element is a border exposing function network element, and that a first network element obtains routing information of an API includes: The first network element receives the routing information of the API from a core function network element or a publishing function network element.

For example, if the first network element is a border exposing function network element, the border exposing function network element may receive the routing information of the API from the core function network element or the publishing function network element. For example, if there is an interface between the border exposing function network element and the publishing function network element, the publishing function network element may directly send the routing information of the API to the border exposing function network element through the interface. For example, if there is no interface between the border exposing function network element and the publishing function network element, the publishing function network element may send the routing information of the API to the core function network element, and then the core function network element sends the routing information of the API to the border exposing function network element.

In an optional embodiment, the first network element is a border exposing function network element, and the method further includes: The first network element sends a request message, where the request message is used to request the routing information of the API, and the request message includes identification information of the API.

For example, the first network element is a border exposing function network element, and the border exposing function network element may further send a request message to the core function network element or the publishing function network element, to request the routing information of the API. Because the routing information is for a specific API, the request message may further include identification information of the requested API. For example, the border exposing function network element sends the foregoing request message to the core function network element or the publishing function network element after receiving the API invocation request from the API invoker, where an API corresponding to the routing information requested by the request message is the API that the API invocation request requests to invoke. The request message may be a service API invocation routing request message (service API invocation routing request), a obtain topology hiding policy request message (obtain topology hiding policy request), or a message sent by another border AEF to the CCF. This is not limited in this embodiment of this application.

In this embodiment of this application, the border exposing function network element receives the API invocation request, and requests the routing information from the core function network element. This prevents the core function network element from actively sending the routing information to the border exposing function network element when the border exposing function network element does not need to use the routing information, thereby saving signaling.

FIG. 4 is a schematic flowchart of a method 400 for invoking an application programming interface according to an embodiment of this application. The method 400 may be applied to the system architecture 100 shown in FIG. 1, or may be applied to the application scenario 200 shown in FIG. 2. This is not limited in this embodiment of this application.

S410. A second network element obtains routing information of an API, where the routing information is used to indicate a route for invoking the API, and the API is provided by a first exposing function network element and a second exposing function network element.

For example, the API is provided by a plurality of exposing function network elements. The plurality of exposing function network elements include the first exposing function network element and the second exposing function network element.

Optionally, the routing information includes information about the first exposing function network element, information about the second exposing function network element, information about a first serving area corresponding to the API, and information about a second serving area corresponding to the API, where the API provided by the first exposing function network element corresponds to the first serving area, and the API provided by the second exposing function network element corresponds to the second serving area.

S420. The second network element sends the routing information to a border exposing function network element, where the routing information is used by the border exposing function network element to determine a target exposing function network element, and the target exposing function network element is determined in the first exposing function network element and the second exposing function network element.

Correspondingly, the border exposing function network element receives the routing information of the API from the second network element, and determines the target exposing function network element in the first exposing function network element and the second exposing function network element based on the routing information and invocation parameter information.

S430. The border exposing function network element obtains the invocation parameter information of the API, where the invocation parameter information is used to handle the API.

The handling (handle) the API may be understood as performing, based on detailed information of an API invocation request, an operation on a resource corresponding to the API. The following uses a protocol data unit (PDU) session service API as an example for description. An operation allowed by the API includes creation (create), update, releasing (release), and the like. The API includes a resource, and is identified by a uniform resource locator which may be, for example, {cmcc.smfapi.com}/{PDU Session}/{v1}. The invocation parameter information may include an object corresponding to the resource, and may be used as an input parameter required by the API. The invocation parameter information is, for example, an identifier of a terminal device, indicating that a PDU session service is provided for the terminal device with the identifier. In an example of handling the API, for example, creating a PDU session for a user 1, it may be understood that an AEF that provides the API creates a session for the user 1 in a resource directory of the API. After the handling, the resource directory may be updated to {cmcc.smfapi.com}/{PDU Session}/{v1}/{user 1}.

Optionally, the invocation parameter information includes identification information of a terminal device (or a subscriber, an application user, or an application client) and/or location information of the terminal device (or the subscriber, the application user, or the application client).

S440. The border exposing function network element determines the target exposing function network element in the first exposing function network element and the second exposing function network element based on the routing information and the invocation parameter information.

According to the method for invoking an application programming interface in this embodiment of this application, in a scenario in which an API is provided by a plurality of exposing function network elements, routing information of the API is sent to the border exposing function network element, so that a target AEF used to invoke the API can be determined in the plurality of exposing function network elements by the border exposing function network element with reference to invocation parameter information of the API. In this way, the border AEF forwards an API invocation request to the target AEF, and invokes the API.

In this embodiment, the second network element may be a core function network element or a publishing function network element.

The determining a target exposing function network element in the first exposing function network element and the second exposing function network element means that the determined target exposing function network element is either of the first exposing function network element and the second exposing function network element. In other words, the target exposing function network element is the first exposing function network element or the second exposing function network element.

For example, an API is provided by a plurality of exposing function network elements. The API provided by different exposing function network elements in the plurality of exposing function network elements corresponds to different serving areas. In other words, there is a correspondence between the plurality of serving areas corresponding to the API and the plurality of exposing function network elements. For ease of understanding and description, this embodiment is described by using an example in which the plurality of exposing function network elements that provide the API include the first exposing function network element and the second exposing function network element, and the plurality of serving areas corresponding to the API include the first serving area and the second serving area. It may be understood that all APIs mentioned in this application are a same API, and details are not described subsequently. The API provided by the first exposing function network element corresponds to the first serving area, and the API provided by the second exposing function network element corresponds to the second serving area.

The serving area indicates a serving range of the API provided by an exposing function network element. For example, if the serving area is represented by a domain name, for example, cmcc.beijing.com, it indicates that the API may provide a service for a user (a terminal device or an application client) in the area range. For example, if the serving area is represented by an IP address segment, for example, 10.11.1.0 to 10.11.1.255, it indicates that the API may provide a service for a user (a terminal device or an application client) whose IP address is in the address range. For example, if the serving area is represented by an IP address prefix, it indicates that the API may provide a service for a user (a terminal device or an application client) having the IP address prefix. For example, if the serving area is represented by location area (area) information, it indicates that the API may provide a service for a user (a terminal device or an application client) whose current location is in the area.

In addition, that an exposing function network element provides the API may be understood as that the exposing function network element handles (handle) the API. For example, the exposing function network element may specifically perform an operation such as creation, modification, deletion, query, or the like on a resource corresponding to the API. Information about the exposing function network element that provides the API may be interface information of the API. The interface information of the API may include an IP address and/or port number information of the exposing function network element, a uniform resource identifier (URI) of an API resource, and the like.

In this case, the second network element may obtain the routing information of the API. For example, the routing information may include the information about the exposing function network element that provides the API and information about the serving area of the API corresponding to the exposing function network element. The second network element sends the routing information of the API to the border exposing function network element. Based on the routing information of the API and then with reference to the invocation parameter information of the API (for example, identification information and/or location information of a terminal device (a subscriber, an application user, or an application client)), the border exposing function network element determines, in a first border exposing function network element and a second border exposing function network element, a target exposing function network element that can actually provide the API in an area corresponding to the terminal device. For a specific method for determining the target exposing function network element by the border exposing function network element, refer to the method 300. Details are not described herein again.

For example, a terminal device is used as an example for description. Identification information of the terminal device may be an ID of the terminal device, or an IP address of the terminal device. Location information of the terminal device may be an IP address of the terminal device, information about an area in which the terminal device is located, or information about a current location of the terminal device. It should be understood that the foregoing terminal device is a terminal device corresponding to the API, that is, the API invoker invokes the API to serve the terminal device. In other words, the API is invoked by the API invoker for the terminal device. For example, the API invoker invokes the API to obtain the information about the terminal device.

In an optional embodiment, the second network element is the core function network element, and the method further includes: The second network element receives the information about the first exposing function network element, the information about the second exposing function network element, the information about the first serving area, and the information about the second serving area from a publishing function network element, where the API provided by the first exposing function network element corresponds to the first serving area, and the API provided by the second exposing function network element corresponds to the second serving area. That a second network element obtains routing information of an API includes: The second network element generates the routing information of the API based on the information about the first exposing function network element, the information about the second exposing function network element, the information about the first serving area, and the information about the second serving area.

Optionally, the routing information may specifically indicate a correspondence between the first serving area and the first exposing function network element, and a correspondence between the second serving area and the second exposing function network element.

For example, the second network element (core function network element) may generate the routing information of the API based on the information about the first exposing function network element, the information about the second exposing function network element, the information about the first serving area, and the information about the second serving area (which are collectively referred to as API information in this specification) that are received. In this case, the second network element may send the routing information of the API to the border exposing function network element, so that the border exposing function network element can determine the target exposing function network element based on the routing information and the invocation parameter information of the API.

In an optional embodiment, before the second network element sends the routing information to the border exposing function network element, the method further includes: The second network element receives a request message from the border exposing function network element, where the request message is used to request the routing information, and the request message includes identification information of the API. That the second network element sends the routing information to a border exposing function network element includes: The second network element sends the routing information to the border exposing function network element based on the request message.

For example, the border exposing function network element may further send a request message to the second network element (that is, the core function network element or the publishing function network element), to request the routing information of the API. Because the routing information is for a specific API, the request message may further include identification information of the requested API. Generally, the border exposing function network element sends the foregoing request message to the core function network element or the publishing function network element after receiving the API invocation request from the API invoker, where an API corresponding to the routing information requested by the request message is the API that the API invocation request requests to invoke. The request message may be a service API invocation routing request message (service API invocation routing request), a obtain topology hiding policy request message (obtain topology hiding policy request), or a message sent by another border AEF to the CCF. This is not limited in this embodiment of this application.

For specific embodiments of the foregoing method, refer to FIG. 5 to FIG. 10 and corresponding text descriptions. Details are not described herein.

For ease of understanding, the following describes the embodiments of this application in detail with reference to FIG. 5 to FIG. 10 by using an example in which the core function network element is a CCF, the publishing function network element is an APF, and the exposing function network element is an AEF.

Figure 5:
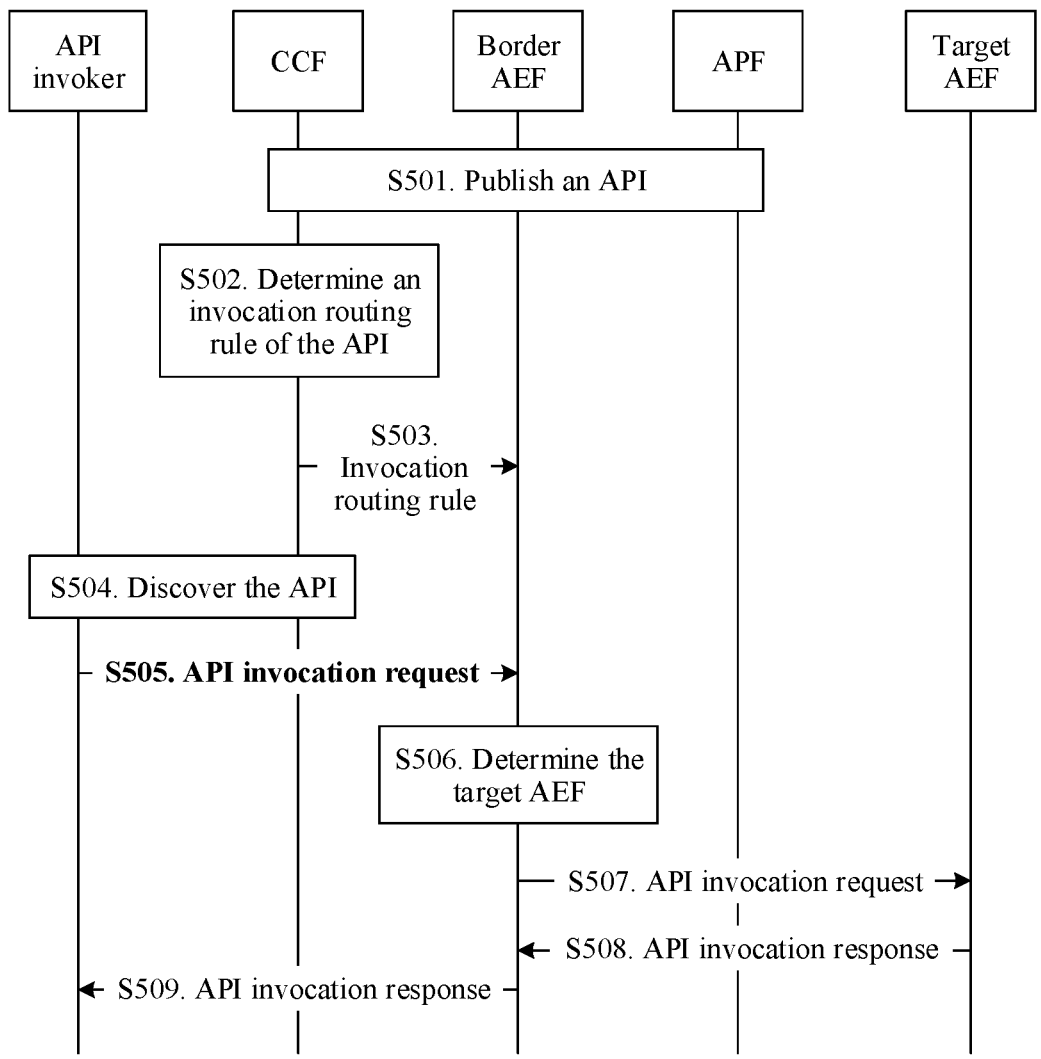
FIG. 5 is a schematic flowchart of another method for invoking an application programming interface according to an embodiment of this application.

FIG. 5 is a schematic flowchart of a method 500 for invoking an application programming interface according to an embodiment of this application. The method 500 may be applied to the system architecture 100 shown in FIG. 1, or may be applied to the application scenario 200 shown in FIG. 2. This is not limited in this embodiment of this application. In this embodiment, API information is equivalent to the routing information of the API.

In S501, an APF and a CCF perform an API publishing procedure.

Specifically, the APF sends an API publishing request to the CCF, where the API publishing request includes the API information. The API information includes a name of an API and information about an AEF that provides the API. The AEF information includes interface information of the API, for example, an IP address, a port number, or a uniform resource identifier (URI). The AEF information further includes information about a serving area corresponding to the API (API serving area). The serving area information may be information such as an IP address segment, an IP address prefix, a geographical or administrative region, or a domain name. The CCF receives the API publishing request sent by the APF, and determines, based on the received API information, to apply a topology hiding policy to the API corresponding to the API information. It should be understood that the topology hiding policy may be applied to all API invokers, or may be applied to some API invokers. The CCF determines a border AEF.

In S502, the CCF determines an invocation routing rule of an API, where the API is an API to which the foregoing topology hiding policy is applied.

For example, the CCF may generate, based on the API information, the invocation routing rule used by the border AEF to determine a target AEF. For example, the CCF may determine the invocation routing rule of the API based on corresponding serving area information (for example, the IP address segment, the geographical or administrative region, or the domain name) in the API information. Further, the invocation routing rule may indicate a mapping relationship between a plurality of serving areas and a plurality of AEFs, or may directly indicate a mapping relationship between a plurality of IP address segments or domain names and a plurality of AEFs.

In S503, the CCF sends the invocation routing rule of the API to the border AEF. Correspondingly, the border AEF receives the invocation routing rule of the API from the CCF.

In S504, the API invoker and the CCF perform an API discovery procedure.

In S505, the API invoker sends an API invocation request to the border AEF, where the API invocation request may include information about an API (for example, an address (URI) of a resource corresponding to the API, or identification information of the API) and invocation parameter information. The invocation parameter information may be specifically a terminal device IP, area information, location information, or the like. The terminal device IP indicates an IP address of a terminal device, and may be an IPv4 or IPv6 address. The area information indicates information about an area in which the API is used. The area information may be network area description information, for example, a cell identifier, a tracking area (tracing area, TA) identifier, and an area of interest identifier, or may be physical area description information. The location information may indicate information about a location at which the API is used, and may be specifically location information of the terminal device.

In S506, the border AEF determines the target AEF based on the invocation routing rule that is of the API and that is received from the CCF and the invocation parameter information.

For example, the plurality of AEFs that provide the API include a first AEF and a second AEF, and serving areas corresponding to the API include a first serving area and a second serving area. The invocation routing rule may indicate a correspondence between the first serving area and the first AEF, and a correspondence between the second serving area and the second AEF. The invocation parameter information may include identification information and/or location information of a terminal device (a subscriber, an application user, or an application client), and further indicate a serving area in which the terminal device is located. For example, the invocation parameter information indicates that the terminal device is located in the second serving area. In this case, the border AEF may determine the second AEF that corresponds to the second serving area and that is in the first AEF and the second AEF as the target AEF based on the second serving area indicated by the invocation parameter information and with reference to the correspondence indicated by the invocation routing rule.

In S507, the border AEF sends the API invocation request to the target AEF, where the API invocation request includes the information about the API (for example, the address (URI) of the resource (resource) corresponding to the API, or the identification information of the API).

In S508, the target AEF sends an API invocation response to the border AEF.

In S509, the border AEF sends the API invocation response to the API invoker.

According to the method for invoking an application programming interface in this embodiment of this application, after receiving the API publishing request from the APF, the CCF obtains the API information, applies the topology hiding policy to the API, and then sends the invocation routing rule of the API to the border AEF. In this way, the border AEF determines the target AEF based on the invocation routing rule of the API, and forwards the API invocation request, thereby completing invocation of the API. In this embodiment, before invocation, the CCF pushes the invocation routing rule to the border AEF. This can reduce an invocation delay caused when the border AEF obtains the invocation routing rule in an API invocation procedure, and help improve API invocation efficiency.

In another possible implementation of this application, the CCF may determine the invocation routing rule based on locally preconfigured AEF information. In this case, a serving range of the API provided by the AEF is the serving area of the AEF.

Figure 6:
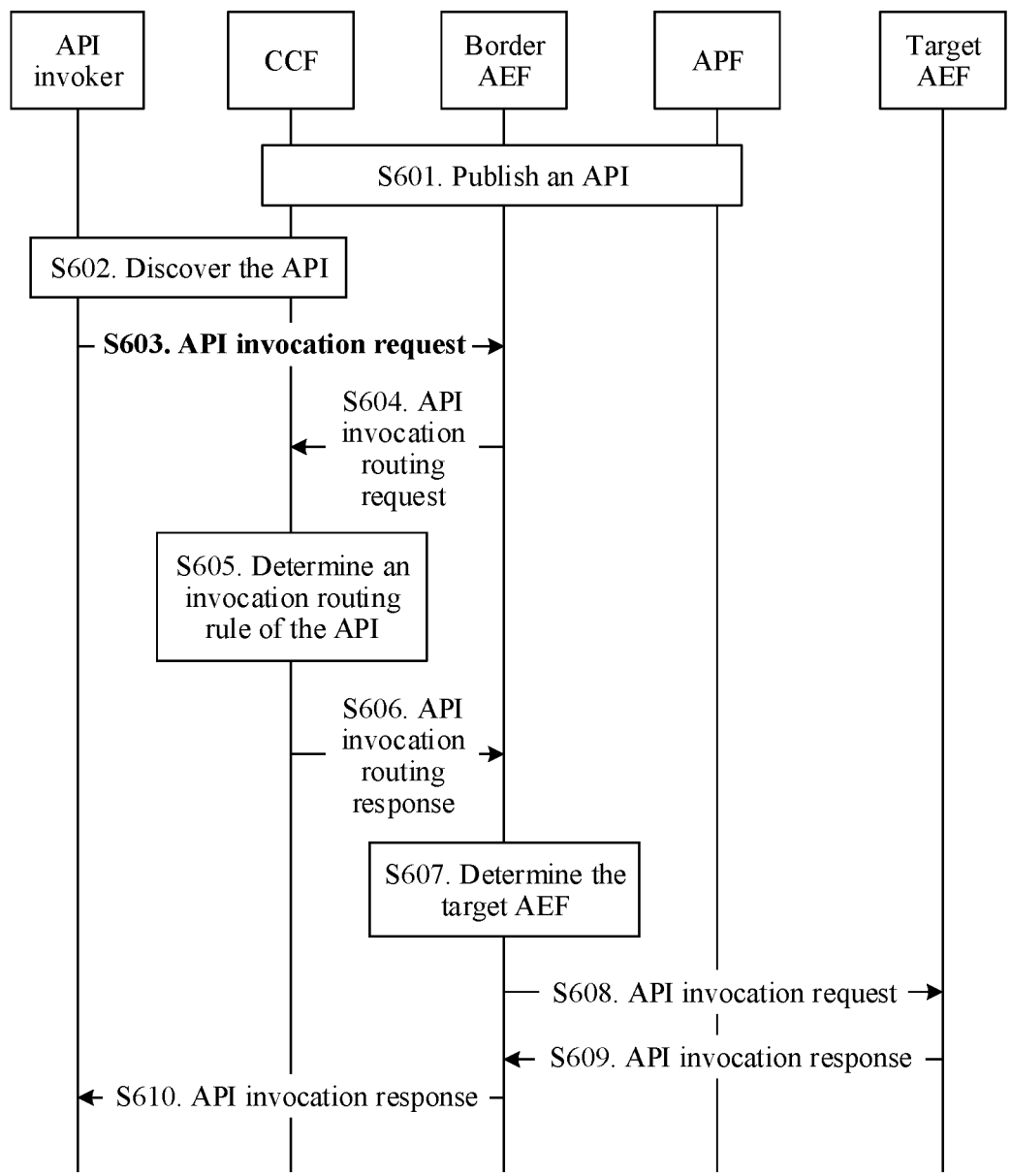
FIG. 6 is a schematic flowchart of another method for invoking an application programming interface according to an embodiment of this application.

FIG. 6 is a schematic flowchart of another method 600 for invoking an application programming interface according to an embodiment of this application. The method 600 may be applied to the system architecture 100 shown in FIG. 1, or may be applied to the application scenario 200 shown in FIG. 2. This is not limited in this embodiment of this application. In this embodiment, API information is equivalent to the routing information of the API.

In S601, an APF and a CCF perform an API publishing procedure.

For example, the APF sends an API publishing request to the CCF, where the API publishing request includes the API information. The API information includes a name of an API and information about an AEF that provides the API. The AEF information includes interface information of the API, for example, an IP address, a port number, or a uniform resource identifier (uniform resource identifier, URI). The AEF information further includes information about a serving area corresponding to the API (API serving area). The serving area information may be information such as an IP address segment, an IP address prefix, a geographical or administrative region, or a domain name. The CCF receives the API publishing request sent by the APF, and determines, based on the received API information, to apply a topology hiding policy to the API corresponding to the API information. It should be understood that the topology hiding policy may be applied to all API invokers, or may be applied to some API invokers. The CCF determines a border AEF.

In S602, the API invoker and the CCF perform an API discovery procedure.

In S603, the API invoker sends an API invocation request to the border AEF, where the API invocation request includes information about an API (for example, an address (URI) of a resource corresponding to the API, or identification information of the API) and invocation parameter information. The invocation parameter information may be specifically a terminal device IP, area information, location information, or the like. The terminal device IP indicates an IP address of a terminal device, and may be an IPv4 or IPv6 address. The area information indicates information about an area in which the API is used. The area information may be network area description information, for example, a cell identifier, a tracking area (tracing area, TA) identifier, and an area of interest identifier, or may be physical area description information. The location information may indicate information about a location at which the API is used, and may be specifically location information of the terminal device.

In S604, the border AEF receives the API invocation request from the API invoker, and sends an API invocation routing request to the CCF.

In S605, the CCF receives the API invocation routing request sent by the border AEF, and determines an invocation routing rule of the API, where the API is an API to which the foregoing topology hiding policy is applied.

For example, the CCF may generate, based on the API information, the invocation routing rule used by the border AEF to determine a target AEF. For example, the CCF may determine the invocation routing rule of the API based on the corresponding IP address segment, serving area, or domain name in the API information. Further, the invocation routing rule may indicate a mapping relationship between a plurality of serving areas and a plurality of AEFs, or may directly indicate a mapping relationship between a plurality of IP address segments or domain names and a plurality of AEFs.

It should be understood that, the determining, by the CCF, the invocation routing rule of the API may alternatively be performed in S602. That is, in the API discovery procedure, the CCF may first generate the invocation routing rule of the API and store the invocation routing rule, and sends the invocation routing rule of the API to the border AEF after receiving the API invocation routing request from the border AEF. This is not limited in this embodiment of this application.

In S606, the CCF sends an API invocation routing response to the border AEF, where the API invocation routing response includes the invocation routing rule of the API.

In S607, the border AEF determines the target AEF based on the invocation routing rule that is of the API and that is received from the CCF and the invocation parameter information included in the API invocation request.

For details about how to determine the target AEF by the border AEF, refer to the descriptions of step S506 in FIG. 5. Details are not described herein again.

In S608, the border AEF sends the API invocation request to the target AEF, where the API invocation request includes the information about the API (for example, the address (URI) of the resource (resource) corresponding to the API, or the identification information of the API).

In S609, the target AEF sends an API invocation response to the border AEF.

In S610, the border AEF sends the API invocation response to the API invoker.

According to the method for invoking an application programming interface in this embodiment of this application, after receiving the API invocation request, the border AEF requests the invocation routing rule of the API from the CCF, determines the target AEF based on the received invocation routing rule of the API and the invocation parameter information, and forwards the API invocation request, thereby completing invocation of the API. Further, in this embodiment of this application, the border exposing function network element receives the API invocation request, and requests the invocation routing rule from the CCF. This prevents the CCF from actively sending the invocation routing rule to the border AEF when the border AEF does not need to use the routing information, thereby saving signaling.

Figure 7:
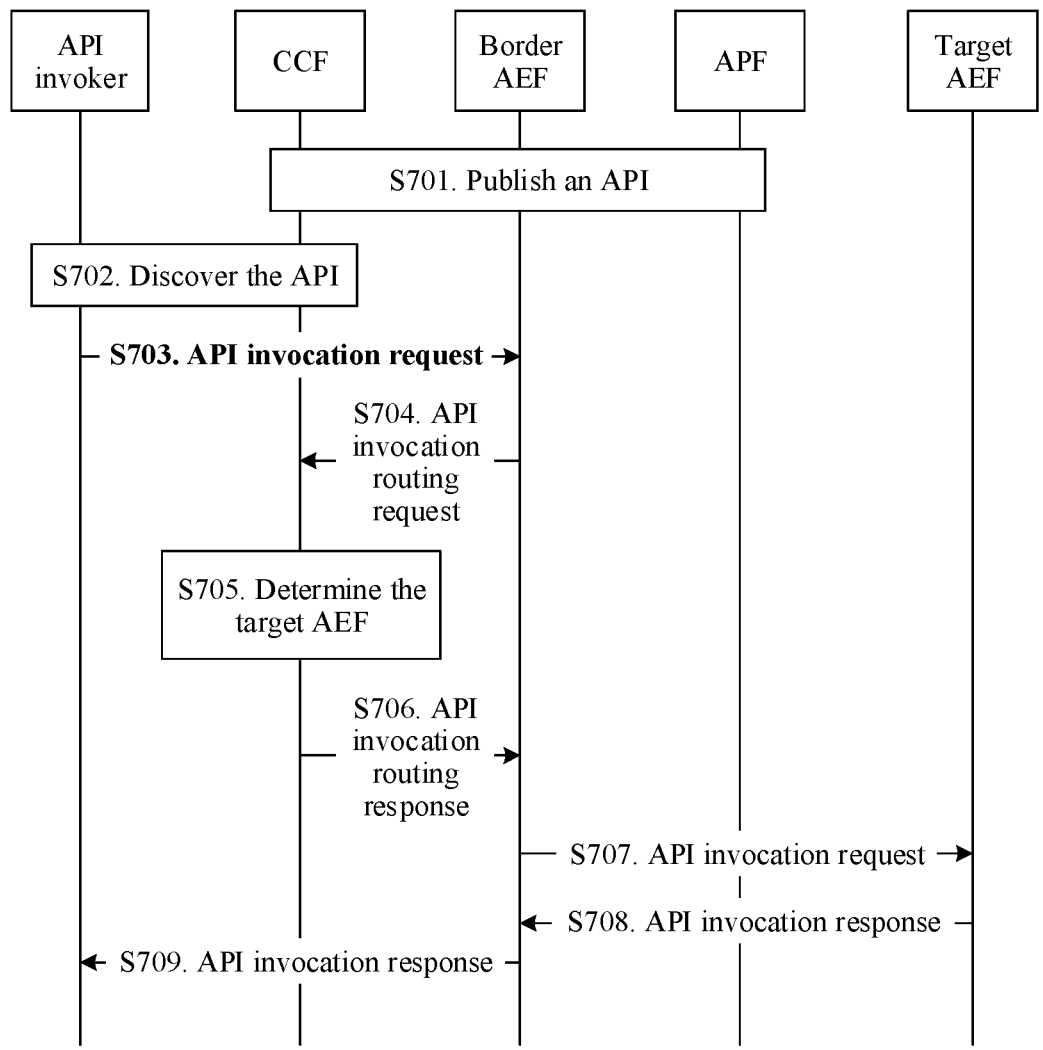
FIG. 7 is a schematic flowchart of another method for invoking an application programming interface according to an embodiment of this application.

FIG. 7 is a schematic flowchart of another method 700 for invoking an application programming interface according to an embodiment of this application. The method 700 may be applied to the system architecture 100 shown in FIG. 1, or may be applied to the application scenario 200 shown in FIG. 2. This is not limited in this embodiment of this application. In this embodiment, API information is equivalent to the routing information of the API.

S701 to S703 are the same as S601 to S603, and details are not described in this embodiment again.

In S704, the border AEF receives the API invocation request from the API invoker, and sends an API invocation routing request to the CCF. The method 700 is different from the method 600 in that the API invocation routing request includes the invocation parameter information that is obtained by the border AEF from the API invoker. The invocation parameter information may be specifically a terminal device IP address, area information, location information, or the like. The terminal device IP address indicates an IP address of a terminal device, and may be an IPv4 or IPv6 address. The area information indicates information about an area in which the API is used. The area information may be network area description information, for example, a cell identifier, a tracking area (tracing area, TA) identifier, and an area of interest identifier, or may be physical area description information. The location information may indicate information about a location at which the API is used, and may be specifically location information of the terminal device.

In S705, the CCF receives the API invocation routing request sent by the border AEF, and determines a target AEF based on the API information and the invocation parameter information.

For example, the plurality of AEFs that provide the API include a first AEF and a second AEF, and serving areas corresponding to the API include a first serving area and a second serving area. The invocation routing rule may indicate a correspondence between the first serving area and the first AEF, and a correspondence between the second serving area and the second AEF. The invocation parameter information may include identification information and/or location information of a terminal device (a subscriber, an application user, or an application client), and further indicate a serving area in which the terminal device is located. For example, the invocation parameter information indicates that the terminal device is located in the second serving area.

In this case, the CCF may determine the second AEF that corresponds to the second serving area and that is in the first AEF and the second AEF as the target AEF based on the second serving area indicated by the invocation parameter information and with reference to the correspondence indicated by the invocation routing rule.

In S706, the CCF sends an API invocation routing response to the border AEF, where the API invocation routing response includes information about the target AEF, for example, an identifier of the target AEF.

S707 to S709 are the same as S608 to S610, and details are not described in this embodiment again.

According to the method for invoking an application programming interface in this embodiment of this application, after receiving the API invocation request, the border AEF requests the target AEF from the CCF, to forward the API invocation request, thereby completing invocation of the API. Further, in this embodiment of this application, the CCF determines the target AEF, and the border AEF only forwards a message as indicated by the CCF, so that load of the border AEF can be reduced.

It should be understood that sequence numbers of the foregoing processes do not indicate an execution sequence. The execution sequence of the processes should be determined based on functions and internal logic of the processes, and should not be construed as any limitation on an implementation process of this embodiment of this application.

The foregoing describes in detail the methods for invoking an application programming interface according to the embodiments of this application with reference to FIG. 1 to FIG. 7. The following describes in detail apparatuses for invoking an application programming interface according to the embodiments of this application with reference to FIG. 8 to FIG. 10.

Figure 8:
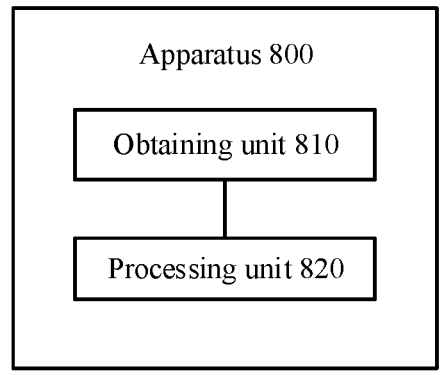
FIG. 8 is a schematic block diagram of an apparatus for invoking an application programming interface according to an embodiment of this application.

FIG. 8 shows an apparatus 800 for invoking an application programming interface according to an embodiment of this application. The apparatus 800 includes an obtaining unit 810 and a processing unit 820. Specifically, the apparatus 800 is configured to perform procedures and steps corresponding to the first network element in the foregoing method 200.

The obtaining unit 810 is configured to: obtain routing information of an API, where the routing information is used to indicate a route for invoking the API, and the API is provided by a first exposing function network element and a second exposing function network element; and obtain invocation parameter information of the API, where the invocation parameter information is used to handle the API.

The processing unit 820 is configured to determine a target exposing function network element in the first exposing function network element and the second exposing function network element based on the routing information and the invocation parameter information.

Optionally, the invocation parameter information includes identification information of a terminal device and/or location information of the terminal device; and/or the routing information includes information about the first exposing function network element, information about the second exposing function network element, information about a first serving area corresponding to the API, and information about a second serving area corresponding to the API, where the API provided by the first exposing function network element corresponds to the first serving area, and the API provided by the second exposing function network element corresponds to the second serving area.

Optionally, the apparatus is a core function network element, and the apparatus further includes a first receiving unit, configured to receive the invocation parameter information of the API from a border exposing function network element; and a first sending unit, configured to send information about the target exposing function network element to the border exposing function network element.

Optionally, the apparatus is the core function network element, and the apparatus further includes: a second receiving unit, configured to receive the routing information of the API from a publishing function network element.

Optionally, the apparatus is the core function network element, and the apparatus further includes a third receiving unit, configured to receive the information about the first exposing function network element, the information about the second exposing function network element, the information about the first serving area corresponding to the API, and the information about the second serving area corresponding to the API from a publishing function network element, where the API provided by the first exposing function network element corresponds to the first serving area, and the API provided by the second exposing function network element corresponds to the second serving area; and the processing unit is further configured to: generate the routing information of the API based on the information about the first exposing function network element, the information about the second exposing function network element, the information about the first serving area, and the information about the second serving area.

Optionally, the apparatus is a border exposing function network element, and the apparatus further includes a fourth receiving unit configured to receive the routing information of the API from a core function network element or a publishing function network element.

Optionally, the apparatus further includes a second sending unit, configured to send a request message, where the request message is used to request the routing information of the API, and the request message includes identification information of the API.

It should be understood that, the apparatus 800 herein is presented in a form of functional units. The term "unit" herein may be an application-specific integrated circuit (application specific integrated circuit, ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, a person skilled in the art may understand that the apparatus 800 may be specifically the first network element in the foregoing embodiments, and the apparatus 800 may be configured to perform procedures and/or steps corresponding to the first network element in the foregoing method embodiments. To avoid repetition, details are not described herein again.

Figure 9:
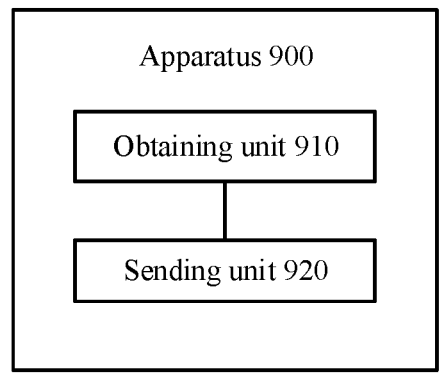
FIG. 9 is a schematic block diagram of another apparatus for invoking an application programming interface according to an embodiment of this application.

FIG. 9 shows another apparatus 900 for invoking an application programming interface according to an embodiment of this application. The apparatus 900 includes an obtaining unit 910 and a sending unit 920. Specifically, the apparatus 900 is configured to perform procedures and steps corresponding to the second network element in the method 300.

The obtaining unit 910 is configured to obtain routing information of an API, where the routing information is used to indicate a route for invoking the API, and the API is provided by a first exposing function network element and a second exposing function network element.

The sending unit 920 is configured to send the routing information to a border exposing function network element, where the routing information is used by the border exposing function network element to determine a target exposing function network element, and the target exposing function network element is determined in the first exposing function network element and the second exposing function network element.

Optionally, the routing information includes information about the first exposing function network element, information about the second exposing function network element, information about a first serving area corresponding to the API, and information about a second serving area corresponding to the API, where the API provided by the first exposing function network element corresponds to the first serving area, and the API provided by the second exposing function network element corresponds to the second serving area.

Optionally, the apparatus is a core function network element, and the apparatus further includes a first receiving unit, configured to receive the information about the first exposing function network element, the information about the second exposing function network element, the information about the first serving area corresponding to the API, and the information about the second serving area corresponding to the API from a publishing function network element, where the API provided by the first exposing function network element corresponds to the first serving area, and the API provided by the second exposing function network element corresponds to the second serving area; and the apparatus further includes: a processing unit, configured to generate the routing information of the API based on the information about the first exposing function network element, the information about the second exposing function network element, the information about the first serving area, and the information about the second serving area.

Optionally, the apparatus further includes a second receiving unit, configured to: before the routing information is sent to the border exposing function network element, receive a request message from the border exposing function network element, where the request message is used to request the routing information, and the request message includes identification information of the API; and the sending unit 920 is specifically configured to: send the routing information to the border exposing function network element based on the request message.

It should be understood that, the apparatus 900 herein is presented in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, a person skilled in the art may understand that the apparatus 900 may be specifically the second network element in the foregoing embodiments, and the apparatus 900 may be configured to perform procedures and/or steps corresponding to the second network element in the foregoing method embodiments. To avoid repetition, details are not described herein again.

The apparatus 800 and the apparatus 900 in the foregoing solutions have functions of implementing corresponding steps performed by the first network element or the second network element in the foregoing methods. The functions may be implemented by hardware, or may be implemented by hardware by executing corresponding software. The hardware or the software includes one or more modules corresponding to the foregoing functions. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In the embodiments of this application, the apparatuses in FIG. 8 and FIG. 9 may alternatively be a chip or a chip system, for example, a system on chip (SoC). Correspondingly, the receiving unit and the sending unit may be a transceiver circuit of the chip. This is not limited herein.

Figure 10:
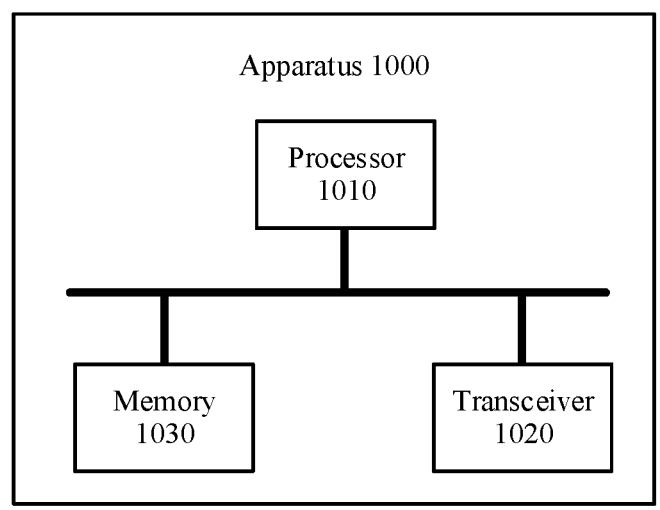
FIG. 10 is a schematic block diagram of another apparatus for invoking an application programming interface according to an embodiment of this application.

FIG. 10 shows another apparatus 1000 for invoking an application programming interface according to an embodiment of this application. The apparatus 1000 includes a processor 1010, a transceiver 1020, and a memory 1030. The processor 1010, the transceiver 1020, and the memory 1030 communicate with each other through an internal connection path. The memory 1030 is configured to store instructions. The processor 1010 is configured to execute the instructions stored in the memory 1030, to control the transceiver 1020 to send a signal and/or receive a signal.

In a possible implementation, the apparatus 1000 is configured to perform procedures and steps corresponding to the first network element in the method 200.

The processor 1010 is configured to: obtain routing information of an API, where the routing information is used to indicate a route for invoking the API, and the API is provided by a first exposing function network element and a second exposing function network element; obtain invocation parameter information of the API, where the invocation parameter information is used to handle the API; and determine a target exposing function network element in the first exposing function network element and the second exposing function network element based on the routing information and the invocation parameter information.

In a possible implementation, the apparatus 1000 is configured to perform procedures and steps corresponding to the second network element in the method 300.

The processor 1010 is configured to: obtain routing information of an API, where the routing information is used to indicate a route for invoking the API, and the API is provided by a first exposing function network element and a second exposing function network element; send, by using the transceiver 1020, the routing information to a border exposing function network element, where the routing information is used by the border exposing function network element to determine a target exposing function network element, and the target exposing function network element is determined in the first exposing function network element and the second exposing function network element.

It should be understood that the apparatus 1000 may be specifically the first network element or the second network element in the foregoing embodiments, and may be configured to perform steps and/or procedures corresponding to the first network element or the second network element in the foregoing method embodiments. Optionally, the memory 1030 may include a read-only memory and a random access memory, and provide instructions and data to the processor. A part of the memory may further include a non-volatile random access memory. For example, the memory may further store information about a device type. The processor 1010 may be configured to execute the instructions stored in the memory. In addition, when the processor 1010 executes the instructions stored in the memory, the processor 1010 is configured to perform steps and/or procedures in the foregoing method embodiments corresponding to the first network element or the second network element.

It should be understood that in this embodiment of this application, the processor of the foregoing apparatus may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, the steps in the foregoing methods may be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the steps of the foregoing method in combination with the hardware of the processor. To avoid repetition, details are not described herein.

In this application, "at least one" refers to one or more, and "a plurality of" refers to two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof indicates any combination of the following, and includes any combination of one or more of the following. For example, at least one (piece) of a, b, or c may indicate the following cases: a, b, c, a and b, a and c, b and c, or a, b, and c, where a, b, and c may be singular or plural.

A person of ordinary skill in the art may be aware that, in combination with the examples described in the embodiments disclosed in this specification, method steps and units can be implemented by electronic hardware, computer software, or a combination thereof. To clearly describe the interchangeability between the hardware and the software, the foregoing has generally described steps and composition of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for ease of convenience and brevity, for a detailed working process of the foregoing system, apparatus, and unit, refer to a corresponding process in the foregoing method embodiments, and details are not repeatedly described herein.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions in the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for invoking an application programming interface (API), comprising:
   obtaining, by a first network element, routing information of the API, wherein the routing information is used to indicate a route for invoking the API, and the API is provided by a first exposing function network element and a second exposing function network element;
   obtaining, by the first network element, invocation parameter information of the API, wherein the invocation parameter information is used to handle the API; and
   determining, by the first network element, a target exposing function network element in the first exposing function network element and the second exposing function network element based on the routing information and the invocation parameter information,
   wherein the routing information comprises information about the first exposing function network element, information about the second exposing function network element, information about a first serving area corresponding to the API, and information about a second serving area corresponding to the API, wherein the API provided by the first exposing function network element corresponds to the first serving area, and the API provided by the second exposing function network element corresponds to the second serving area.

2. The method according to claim 1, wherein the invocation parameter information comprises at least one of identification information of a terminal device or location information of the terminal device.

3. The method according to claim 1, wherein the first network element is a core function network element, and the obtaining, by the first network element, invocation parameter information of the API comprises:
   receiving, by the first network element, the invocation parameter information of the API from a border exposing function network element; and
   the method further comprises:
   sending, by the first network element, information about the target exposing function network element to the border exposing function network element.

4. The method according to claim 1, wherein the first network element is a core function network element, and the obtaining, by a first network element, routing information of the API comprises:
   receiving, by the first network element, the routing information of the API from a publishing function network element.

5. The method according to claim 1, wherein the first network element is a core function network element, and the method further comprises:
   receiving, by the first network element, information about the first exposing function network element, information about the second exposing function network element, information about the first serving area corresponding to the API, and information about the second serving area corresponding to the API from a publishing function network element, wherein the API provided by the first exposing function network element corresponds to the first serving area, and the API provided by the second exposing function network element corresponds to the second serving area; and
   the obtaining, by a first network element, routing information of the API comprises:
   generating, by the first network element, the routing information of the API based on the information about the first exposing function network element, the information about the second exposing function network element, the information about the first serving area, and the information about the second serving area.

6. The method according to claim 1, wherein the first network element is a border exposing function network element, and the obtaining, by a first network element, routing information of the API comprises:
   receiving, by the first network element, the routing information of the API from a core function network element or a publishing function network element.

7. The method according to claim 6, wherein the method further comprises:
   sending, by the first network element, a request message, wherein the request message is used to request the routing information of the API, and the request message comprises identification information of the API.

8. The method according to claim 1, wherein the routing information is an invocation routing rule of the API.

9. A method for invoking an application programming interface (API), comprising:
- obtaining, by a second network element, routing information of the API, wherein the routing information is used to indicate a route for invoking the API, and the API is provided by a first exposing function network element and a second exposing function network element; and
- sending, by the second network element, the routing information to a border exposing function network element, wherein the routing information is used by the border exposing function network element to determine a target exposing function network element, and the target exposing function network element is determined in the first exposing function network element and the second exposing function network element,
- wherein the routing information comprises information about the first exposing function network element, information about the second exposing function network element, information about a first serving area corresponding to the API, and information about a second serving area corresponding to the API, wherein the API provided by the first exposing function network element corresponds to the first serving area, and the API provided by the second exposing function network element corresponds to the second serving area.

10. The method according to claim 9, wherein the second network element is a core function network element, and the method further comprises:
- receiving, by the second network element, information about the first exposing function network element, information about the second exposing function network element, information about the first serving area corresponding to the API, and information about the second serving area corresponding to the API from a publishing function network element, wherein the API provided by the first exposing function network element corresponds to the first serving area, and the API provided by the second exposing function network element corresponds to the second serving area; and
- the obtaining, by a second network element, routing information of the API comprises:
- generating, by the second network element, the routing information of the API based on the information about the first exposing function network element, the information about the second exposing function network element, the information about the first serving area, and the information about the second serving area.

11. The method according to claim 9, wherein before the sending, by the second network element, the routing information to a border exposing function network element, the method further comprises:
- receiving, by the second network element, a request message from the border exposing function network element, wherein the request message is used to request the routing information, and the request message comprises identification information of the API; and
- the sending, by the second network element, the routing information to a border exposing function network element comprises:
- sending, by the second network element, the routing information to the border exposing function network element based on the request message.

12. The method according to claim 9, wherein the routing information is an invocation routing rule of the API.

13. A system, comprising a first network element and a second network element, wherein:

the second network element comprises a second processor and a second non-transitory computer-readable storage medium coupled to the second processor and storing second instructions, which when executed by the second processor, cause the second network element to obtain routing information of an application programming interface (API), wherein the routing information is used to indicate a route for invoking the API, and the API is provided by a first exposing function network element and a second exposing function network element; and send the routing information to the first network element;

the first network element comprises a first processor and a first non-transitory computer-readable storage medium coupled to the first processor and storing first instructions, which when executed by the first processor, cause the first network element to obtain the routing information of the API; obtain invocation parameter information of the API, wherein the invocation parameter information is used to handle the API; and determine a target exposing function network element in the first exposing function network element and the second exposing function network element based on the routing information and the invocation parameter information, wherein the routing information comprises information about the first exposing function network element, information about the second exposing function network element, information about a first serving area corresponding to the API, and information about a second serving area corresponding to the API, wherein the API provided by the first exposing function network element corresponds to the first serving area, and the API provided by the second exposing function network element corresponds to the second serving area.

14. The system according to claim 13, wherein the first network element is a border exposing function network element, and the first instructions cause the first network element to receive the routing information of the API from a core function network element or a publishing function network element.

15. The system according to claim 14, wherein the first instructions further cause the first network element to:
- send a request message, wherein the request message is used to request the routing information of the API, and the request message comprises identification information of the API.

16. The system according to claim 13, wherein the routing information is an invocation routing rule of the API.

17. The system according to claim 13, wherein the second instructions further cause the second network element to receive a request message from a border exposing function network element, wherein the request message is used to request the routing information, and the request message comprises identification information of the API; and
- the second instructions cause the second network element to send the routing information to the border exposing function network element based on the request message.

18. The method according to claim 1, wherein the information about the first serving area corresponding to the API is an IP address range served by the API provided by the first exposing function network element, and/or the information about the second serving area corresponding to the API is an IP address range served by the API provided by the second exposing function network element.

19. A network element, comprising:
at least one processor; and
a non-transitory computer-readable storage medium coupled to the at least one processor and storing one or more instructions, which when executed by the at least one processor, cause the network element to perform operations comprising:
obtaining routing information of an application programming interface (API), wherein the routing information is used to indicate a route for invoking the API, and the API is provided by a first exposing function network element and a second exposing function network element;
obtaining invocation parameter information of the API, wherein the invocation parameter information is used to handle the API; and
determining a target exposing function network element in the first exposing function network element and the second exposing function network element based on the routing information and the invocation parameter information,
wherein the routing information comprises information about the first exposing function network element, information about the second exposing function network element, information about a first serving area corresponding to the API, and information about a second serving area corresponding to the API, wherein the API provided by the first exposing function network element corresponds to the first serving area, and the API provided by the second exposing function network element corresponds to the second serving area.

20. The network element according to claim 19, wherein the information about the first serving area corresponding to the API is an IP address range served by the API provided by the first exposing function network element, and/or the information about the second serving area corresponding to the API is an IP address range served by the API provided by the second exposing function network element.

21. The network element according to claim 19, wherein the network element is a border exposing function network element, and the operations for obtaining the routing information of the API comprises:
receiving the routing information of the API from a core function network element or a publishing function network element.

22. The network element according to claim 21, wherein the operations further comprises:
sending a request message, wherein the request message requests the routing information of the API, and the request message comprises identification information of the API.

23. A network element, comprising:
at least one processor; and
a non-transitory computer-readable storage medium coupled to the at least one processor and storing one or more instructions, which when executed by the at least one processor, cause the network element to perform operations comprising:
obtaining routing information of an application programming interface (API), wherein the routing information is used to indicate a route for invoking the API, and the API is provided by a first exposing function network element and a second exposing function network element; and
sending the routing information to a border exposing function network element, wherein the routing information is used by the border exposing function network element to determine a target exposing function network element, and the target exposing function network element is determined in the first exposing function network element and the second exposing function network element,
wherein the routing information comprises information about the first exposing function network element, information about the second exposing function network element, information about a first serving area corresponding to the API, and information about a second serving area corresponding to the API, wherein the API provided by the first exposing function network element corresponds to the first serving area, and the API provided by the second exposing function network element corresponds to the second serving area.

24. The network element according to claim 23, wherein before the sending the routing information to the border exposing function network element, the operations further comprises:
receiving a request message from the border exposing function network element, wherein the request message requests the routing information, and the request message comprises identification information of the API, and
wherein the operations for sending the routing information to the border exposing function network element comprises:
sending the routing information to the border exposing function network element based on the request message.

25. A method for invoking an application programming interface (API), comprising:
sending, by a second network element, routing information of the API, wherein the routing information is used to indicate a route for invoking the API, and the API is provided by a first exposing function network element and a second exposing function network element;
obtaining, by a first network element, invocation parameter information of the API, wherein the invocation parameter information is used to handle the API; and
determining, by the first network element, a target exposing function network element in the first exposing function network element and the second exposing function network element based on the routing information and the invocation parameter information,
wherein the routing information comprises information about the first exposing function network element, information about the second exposing function network element, information about a first serving area corresponding to the API, and information about a second serving area corresponding to the API, wherein the API provided by the first exposing function network element corresponds to the first serving area, and the API provided by the second exposing function network element corresponds to the second serving area.

* * * * *